(12) United States Patent
Kim

(10) Patent No.: US 6,459,390 B1
(45) Date of Patent: Oct. 1, 2002

(54) METHOD OF INPUTTING CHARACTERS IN A WIRELESS PORTABLE TERMINAL

(75) Inventor: Ho-Kyu Kim, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/537,794

(22) Filed: Mar. 29, 2000

(30) Foreign Application Priority Data

Mar. 29, 1999 (KR) .............................. 99-10743

(51) Int. Cl.$^7$ .............................................. H03K 17/94
(52) U.S. Cl. .......................... 341/20; 341/22; 341/28; 348/171; 348/168; 379/368; 379/433.07; 708/146
(58) Field of Search .............................. 341/28, 20, 22; 379/433.06, 433.07, 354, 368; 345/168, 171; 708/142, 146

(56) References Cited

U.S. PATENT DOCUMENTS

| | | | | |
|---|---|---|---|---|
| 4,825,464 A | * | 4/1989 | Wen | 379/354 |
| 5,677,949 A | * | 10/1997 | Macor | 341/22 |
| 5,914,676 A | * | 6/1999 | Akpa | 341/22 |
| 6,043,760 A | * | 3/2000 | Laakkonen | 341/22 |
| 6,172,625 B1 | * | 1/2001 | Jin et al. | 341/106 |
| 6,184,803 B1 | * | 2/2001 | Burrell | 341/22 |
| 6,378,234 B1 | * | 4/2002 | Luo | 341/22 |

* cited by examiner

Primary Examiner—Michael Horabik
Assistant Examiner—Albert K. Wong
(74) Attorney, Agent, or Firm—Steve Cha; Klauber & Jackson

(57) ABSTRACT

A method for inputting a plurality of characters in a wireless portable terminal of the type having a memory for storing a plurality of characters and a plurality of indices associated with each one of the plurality of characters, comprising the steps of: determining if a mode for inputting a character is selected; displaying at least one character along with at least one index associated thereto in response to the selection of the character-input mode; determining if the key data corresponding to the index is inputted; and, displaying and storing the associated character corresponding to the index when the key data corresponding to the index is inputted.

17 Claims, 3 Drawing Sheets

METHOD OF INPUTTING CHARACTERS IN A WIRELESS PORTABLE TERMINAL

CLAIM OF PRIORITY

This application makes reference to, incorporates the same herein, and claims all benefits accruing under 35 U.S.C. Section 119 from an application for METHOD OF INPUTTING CHARACTERS IN A WIRELESS PORTABLE TERMINAL filed earlier in the Korean Industrial Property Office on Mar. 29, 1999 and there duly assigned Ser. No. 10743/1999.

BACKGROUND OF THE INVENTION

1. Field of the Invention

The present invention relates to the inputting of character data in a wireless portable terminal, and more particularly to a method of easily inputting the character data by minimizing the number of times a user has to depress the key pad.

2. Description of the Related Art

In general, the development of wireless portable terminals follows the continuing trend toward carrying a smaller and lighter terminal. As the size of a wireless portable terminal becomes smaller, the space occupied by the input key pad in the wireless portable terminal also has to become smaller. For this reason, most wireless portable terminals include only the basic function keys and the numeral keys. Meanwhile, the diverse function of the wireless portable terminal leads to a trend towards increasing the number of keys necessary to facilitate the different needs.

In order to solve the above-mentioned problem in a given basic function key, a variety of operations is executed and ordered but depends on the number of times and the duration that a particular key is depressed. That is, one key can perform multiple functions by manipulating how and how often a given key pad is pressed. It is easier to set a key for performing one package operation. For example, a numeral "1" key may be depressed extendedly for a predetermined period of time for selecting a specific function.

Yet, there has been a problem that, when having to input a plurality of characters, the key input portion of the wireless portable terminal does not basically have a sufficient number of numeral keys to correspond individually to all different characters. Thus, the different characters are inputted in accordance with the depression frequency and the duration of the key pad depression. Thus, the conventional wireless portable terminal allows a plurality of characters to be allocated to one numeral key, thus the desired character to be inputted depends on the frequency of depressing the key pad. For example, in order to input a letter of the alphabet from "A," "B.," or "C", the same numeric key pad "2" has to be pressed at a different number of times depending on which letter of the alphabet is desired to be inputted. Accordingly, a user suffers the inconvenience of having to depress the same key too many times which results in the waste of operating time and inefficiency in inputting characters.

SUMMARY OF THE INVENTION

Therefore, an object of the invention is to provide a method of minimizing the frequency that a user's depresses the key pad upon inputting the character data in a wireless portable terminal.

It is another object of the invention to provide a method of easily inputting the character data in a wireless portable terminal.

In accordance with one embodiment of the present invention, a method of inputting a plurality of characters in a wireless portable terminal includes a memory for storing the plurality of characters and a plurality of indices associated with each one of the plurality of characters for each of character modes, comprising the steps of:

determining if a character-input mode is selected;

displaying at least one character along with at least one index associated therewith in response to the selection of the character-input mode;

determining if a key data corresponding to the index is inputted; and, displaying and storing an associated character allocated to the index when the key data corresponding to the index is inputted.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference to the preferred embodiments of the present invention. In the following description of the present invention will now be made in greater detail, numerous specific details, such as concrete process routines, are set forth to provide a more thorough understanding of the present invention. It will be apparent, however, to those skilled in the art that the invention may be practiced other than according to the previously mentioned specific details. For the purpose of clarity, a detailed description of well-known functions and configurations incorporated herein will be omitted as it may make the subject matter of the present invention rather unclear.

Figure 1:
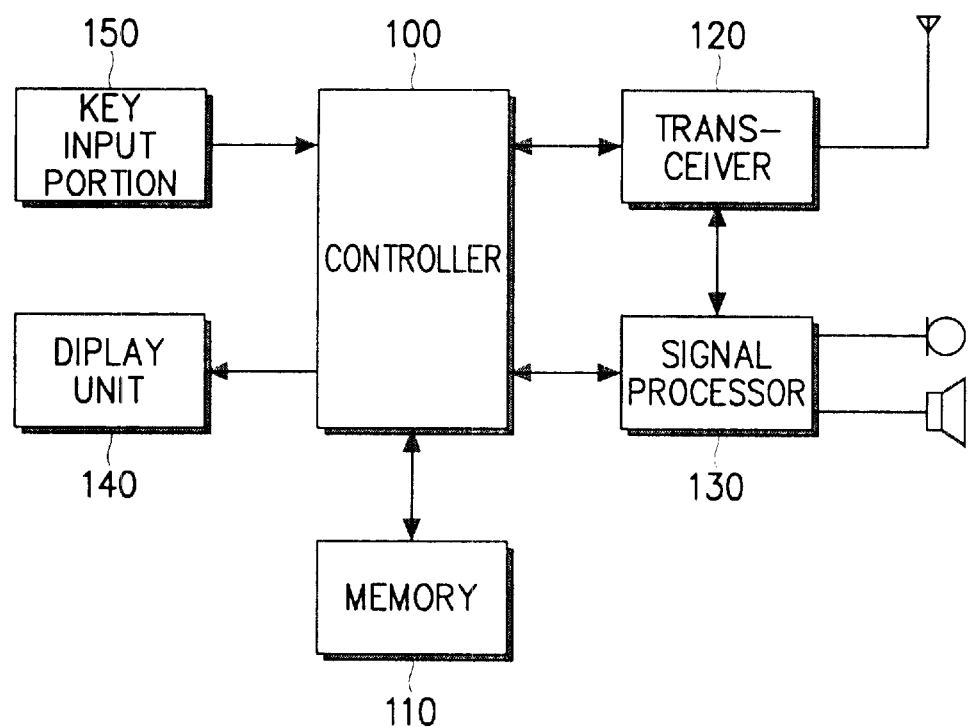
FIG. 1 is a schematic block diagram illustrating the construction of a wireless portable terminal according to the preferred embodiment of the present invention.

FIG. 1 is a schematic block diagram illustrating the construction of a wireless portable terminal according to the preferred embodiment of the present invention.

As shown in FIG. 1, a controller 100 is adapted to control the overall operation of a wireless portable terminal and perform the control operation in a character-input mode according to a preferred embodiment of the present invention. A memory 110 includes a ROM (Read Only Memory) and a RAM (Random Access Memory) for storing programs, data, and voice. It stores the data for each of the character modes according to an embodiment of the present invention. A transmitter/receiver, i.e., a transceiver 120 serves to perform the frequency conversion operation for transmitting and receiving a signal in the wireless portable terminal. A signal processor 130 converts an audio signal inputted to a microphone into a digital signal for application to the transmitter/receiver 120, and demodulates a signal received by an antenna to output the demodulated signal as an audio signal through a speaker to the outside. A display unit 140 may include an LCD (Liquid Crystal Display)

adapted to display a variety of information data generated from the wireless portable terminal on the viewing screen thereof. A key input portion 150 allows for the execution of the interfacing operation between a user and a wireless portable terminal, and it includes various function keys such as numeric keys, an alphanumeric key and related keys, and a plurality of other keys for operating the wireless portable terminal, such as a PWR key and a SEND key. The key input portion 150 also generates the key data in response to the depression of one of the plurality of keys by a user which is applied to the controller 100.

Figure 2:
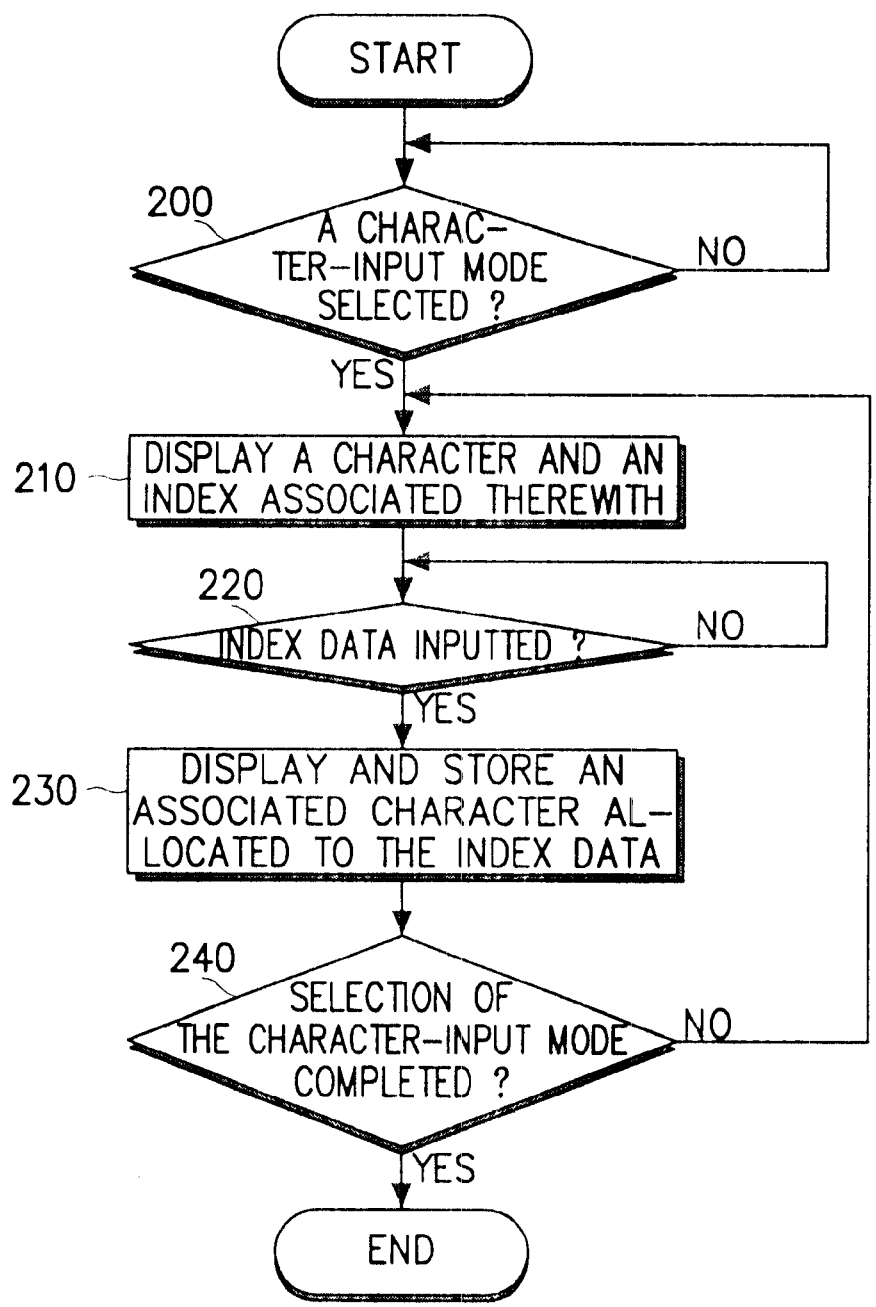
FIG. 2 is a flowchart illustrating the process of implementing the character inputting operation according to the preferred embodiment of the present invention; and, FIG. 3 is a schematic view illustrating a display unit and a key input portion according to the preferred embodiment of the present invention.

FIG. 2 is a flowchart illustrating the process of implementing the character inputting operation according to the preferred embodiment of the present invention.

Figure 3:
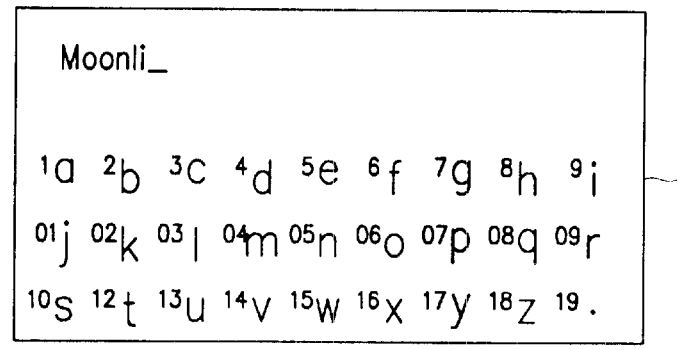
Figure 3:
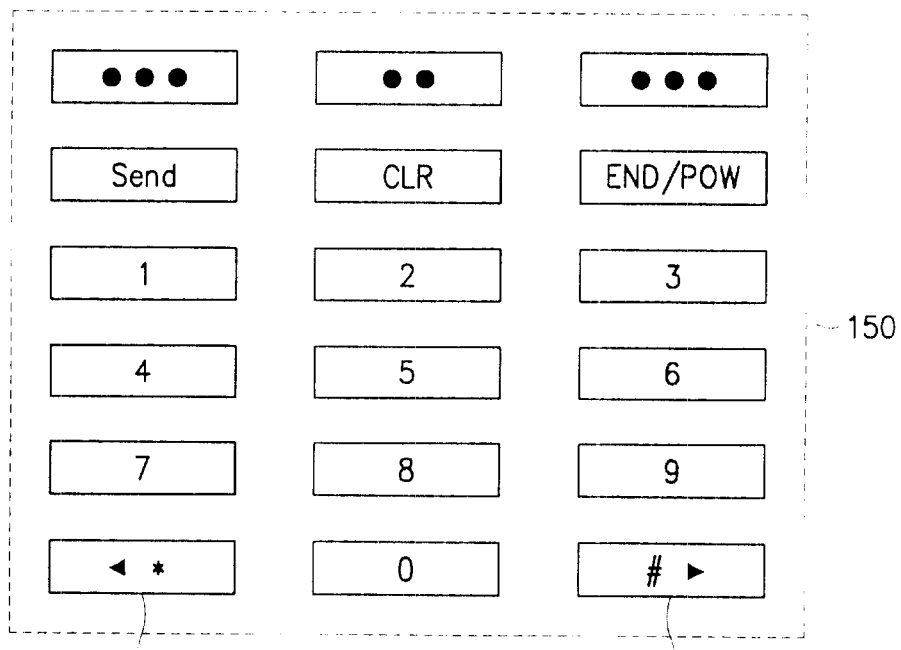

FIG. 3 is a schematic view illustrating the display unit and the key input portion according to the preferred embodiment of the present invention.

The character inputting operation according to the preferred embodiment of the present invention will be described in detail hereinafter with reference to FIGS. 1 to 3.

First, at step 200, the controller 100 determines whether a user selects the character-input mode. The term, "character-input mode" refers to a mode allowing for character input operation required for storing of a telephone number or the input of a schedule with characters. If it is determined in step 200 that the character-input mode is selected, the program proceeds to step 210 at which the controller 100 allows the characters of the selected character mode to be displayed along with indices associated therewith. FIG. 3 shows an example of displaying a plurality of characters of the selected character mode and a plurality of indices each allocated to an associated one of the characters. In FIG. 3, a lower-case letter mode in an English mode is illustrated. That is, a user depresses the key, "7", on a plurality of numeric keys of the key input portion 150 to input the character, "g", following having already inputted the characters "M-o-o-n-l-i" in an effort to input the term "Moonlight." A plurality of alphabet characters and a plurality of indices each corresponding to one associated alphabet character in a lower-case letter mode of an English mode is expressed in Table 1 below.

TABLE 1

| ADDRESSES | CHARACTERS | INDICES |
|---|---|---|
| 1 | a | 1 |
| 2 | b | 2 |
| 3 | c | 3 |
| 4 | d | 4 |
| 5 | e | 5 |
| 6 | f | 6 |
| 7 | g | 7 |
| 8 | h | 8 |
| 9 | i | 9 |
| 10 | j | 01 |
| 11 | k | 02 |
| 12 | l | 03 |
| 13 | m | 04 |
| 14 | n | 05 |
| 15 | o | 06 |
| 16 | p | 07 |
| 17 | q | 08 |
| 18 | r | 09 |
| 19 | s | 10 |
| 20 | t | 12 |
| 21 | u | 13 |
| 22 | v | 14 |
| 23 | w | 15 |

TABLE 1-continued

| ADDRESSES | CHARACTERS | INDICES |
|---|---|---|
| 24 | x | 16 |
| 25 | y | 17 |
| 26 | z | 18 |
| 27 | . | 19 |

It should also be noted that the selection of a character mode can be executed by a Korean alphabet/English-converting operation by pressing the key, "#>", included in the key input portion 150, as shown in FIG. 3. Moreover, a different combination of languages can be implemented in the present invention. A vowel/consonant-converting operation and an upper-case/a lower-case letter-converting operation can be achieved by pressing the key, "<*", included therein during the selecting operation of the character-input mode. In FIG. 3, only the lower-case letter mode in the English mode is represented, but the Korean alphabet mode may be stored in such a fashion that it is divided into a consonant mode and a vowel mode. For the purpose of illustration, the indices each corresponding to an associated one of the plurality of characters in the English lower-case letter mode as shown in Table 1 is used.

Now, an explanation of the character inputting process according to the preferred embodiment of the present invention will be given in detail hereinafter with reference to FIG. 2.

First, at step 200, the controller 100 determines whether an index data is inputted from the key input portion 150. At step 220, if the key data of "7" is inputted, the controller 100 recognizes the keyed-in value corresponding to "7" as "g" in the English lower-case letter mode, as set forth in the preset character values. Then, the program proceeds to step 230 at which the controller 100 allows the associated character corresponding to the inputted numeral to be displayed on the display unit 140 and allows the associated character to be stored in the memory 110. At the subsequent step 240, the controller 100 determines whether the last key data is inputted. If it is determined at step 240 that the last key data is not inputted, the program returns to the previous steps 210 where the controller 100 performs the following steps 210 through 240 again. In the preferred embodiment of the present invention, a plurality of characters and a plurality of indices are stored in the memory 110 in such a fashion that each of the plurality of indices is matched to an associated one of the plurality of characters. Also, when an index data is inputted, the associated character corresponding to the index data is supposed to be displayed and stored.

However, when a user wishes to input a numeric value during the character-input operation, the desired numeric number can not be inputted by pressing the desired numeric key pad. In order to avoid this problem, a different scheme is used. A user can input the desired numeral in the following method. That is, if a user wants to input a specific numeric value during the character-input mode, the input operation of the desired numeral can be executed by depressing the key of the desired numeral twice. As seen apparently from the Table 1, it should be understood that there is no pair having the identical numerals (e.g., "11", "22", "33") in the indices of Table 1. Accordingly, the numeric value can be inputted without confusing the already existing pre-recorded index data or character data.

To describe briefly the character input operation according to the embodiment of the present invention, the characters to be inputted and the indices associated with each one of the characters are stored together in the memory 110. When the character-input mode is selected, one or more characters of any one of the English mode, the Korean alphabet mode, or other language mode as well as one or more indices associated with these different characters are displayed on the display unit 140, as illustrated in FIG. 3. Then, when the numeral key pad corresponding to an index data is keyed-in, the keyed-in index data is recognized as one of the preset characters associated to the keyed-in index data; thus, the associated character to the keyed-in index data is displayed on the display unit 140 and stored in the memory 110.

As described above, the character input method of the present invention provides an advantage that when a character data is inputted, the frequency for the user for depressing a given key in the prior art is minimized; thus, the character message can be easily inputted and the efficiency in the use of the wireless portable terminal is enhanced.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of inputting a plurality of characters in a wireless portable terminal having a memory for storing the plurality of characters and a plurality of indices associated with each one of the plurality of characters, comprising the steps of:
   (a) determining whether a character mode for inputting the characters is selected;
   (b) displaying at least one character and at least one index number associated with the one character if the character-input mode is selected;
   (c) determining whether at least one key corresponding to the displayed index number is inputted; and,
   (d) displaying the character associated with the inputted index number and storing the displayed character in the memory.

2. The method according to claim 1, wherein the index number corresponds to one of numeral keys included in the terminal.

3. The method according to claim 1, wherein the character mode comprises a Korean alphabet mode having a consonant/vowel mode and an English mode having an upper-case/lower case letter mode.

4. The method according to claim 1, wherein the character mode comprises a combination of English mode and other language mode with an upper-case/lower case letter mode.

5. The method according to claim 1, wherein an input of a numeric value during the character-input mode is executed by depressing the key corresponding to the numeric value twice.

6. The method according to claim 1, wherein the method further comprises the step of displaying the character and the index number displayed in the step (b) following the step (d).

7. A method of inputting a plurality of characters in a wireless portable terminal having a memory for storing the plurality of characters and a plurality of indices associated with each one of the plurality of characters, comprising the steps of:
   (a) determining whether a character mode for inputting the characters is selected;
   (b) displaying the plurality of characters and a plurality of index numbers associated with the plurality of characters on the terminal if the character-input mode is selected;
   (c) determining whether at least one key corresponding to one of the index numbers is inputted; and,
   (d) displaying the character associated with the inputted index number and storing the displayed character in the memory.

8. The method according to claim 7, wherein the index number corresponds to one of numeral keys included in the terminal.

9. The method according to claim 8, wherein the character mode comprises a Korean alphabet mode having a consonant/vowel mode and an English mode having an upper-case/lower case letter mode.

10. The method according to claim 7, wherein the character mode comprises a combination of English mode and other language mode with an upper-case/lower case letter mode.

11. The method according to claim 8, wherein an input of a numeric value during the character-input mode is executed by depressing the key corresponding to the numeric value twice.

12. The method according to claim 7, wherein the method further comprises the step of displaying the plurality of characters and the plurality of index numbers displayed in the step (b) following the step (d).

13. A method of inputting a plurality of characters in a wireless portable terminal having a memory for storing the plurality of characters and a plurality of indices associated with each one of the plurality of characters, comprising the steps of:
   (a) determining whether a character mode for inputting the characters is selected;
   (b) displaying the plurality of characters and a plurality of index numbers associated with the plurality of characters on the terminal if the character-input mode is selected;
   (c) determining whether at least one key corresponding to one of the index numbers is inputted; and,
   (d) displaying the character associated with the inputted index number on the terminal and storing the displayed character in the memory,
   (e) displaying the plurality of characters and the plurality of index numbers displayed in the step (b) on the terminal.

14. The method according to claim 13, wherein the index number corresponds to one of numeral keys included in the terminal.

15. The method according to claim 13, wherein the character mode comprises a Korean alphabet mode having a consonant/vowel mode and an English mode having an upper-case/lower case letter mode.

16. The method according to claim 13, wherein the character mode comprises a combination of English mode and other language mode with an upper-case/lower case letter mode.

17. The method according to claim 13, wherein an input of a numeric value during the character-input mode is executed by depressing the key corresponding to the numeric value twice.

* * * * *